April 10, 1934.  E. C. HASSLER  1,954,292
HYDRAULIC COUPLING
Filed July 22, 1931  2 Sheets-Sheet 1

INVENTOR
E. C. Hassler,
BY
ATTORNEY

April 10, 1934.　　　E. C. HASSLER　　　1,954,292
HYDRAULIC COUPLING
Filed July 22, 1931　　　2 Sheets-Sheet 2

WITNESSES

INVENTOR
E. C. Hassler,
BY
ATTORNEY

Patented Apr. 10, 1934

1,954,292

UNITED STATES PATENT OFFICE 1,954,292

HYDRAULIC COUPLING

Ernest C. Hassler, Connersville, Ind.

Application July 22, 1931, Serial No. 552,531

3 Claims. (Cl. 64—96)

This invention relates to improvements in couplings, and it consists of the constructions, combinations and arrangements herein described and claimed.

An object of the invention is to provide a hydraulic coupling embodying an arrangement of plungers and abutments between the driving and driven members, the principle of the plungers being the capability of establishing an equalization of pressures in the fluid volumes which back the various plungers, so that initial differences in the positions of the plungers will be eliminated and that all of the plungers will be held to the proper contacting positions with adjacent abutments.

A further object of the invention is to provide a coupling wherein any tendency toward misalinement of the driving and driven members is compensated for by the freely seated plungers which have the facility of causing an equal fluid pressure behind all of the plungers of the respective set so that every one of such plungers will be automatically adjusted to a contacting position with an adjacent abutment.

Other objects and advantages will appear in the following specification, reference being had to the accompanying drawings in which Figure 1 is a side elevation of the improved hydraulic coupling.

The hydraulic coupling generally denoted 1 comprises driver and driven members 2, 3 (Fig. 1), each of these having a hub 4 in which driver and driven shafts (not shown) are intended to be keyed or otherwise secured. The members 2 and 3 are herein denoted as driver and driven members merely for the purpose of illustration because every principle of operation would be the same if the reverse were true.

Figure 3:
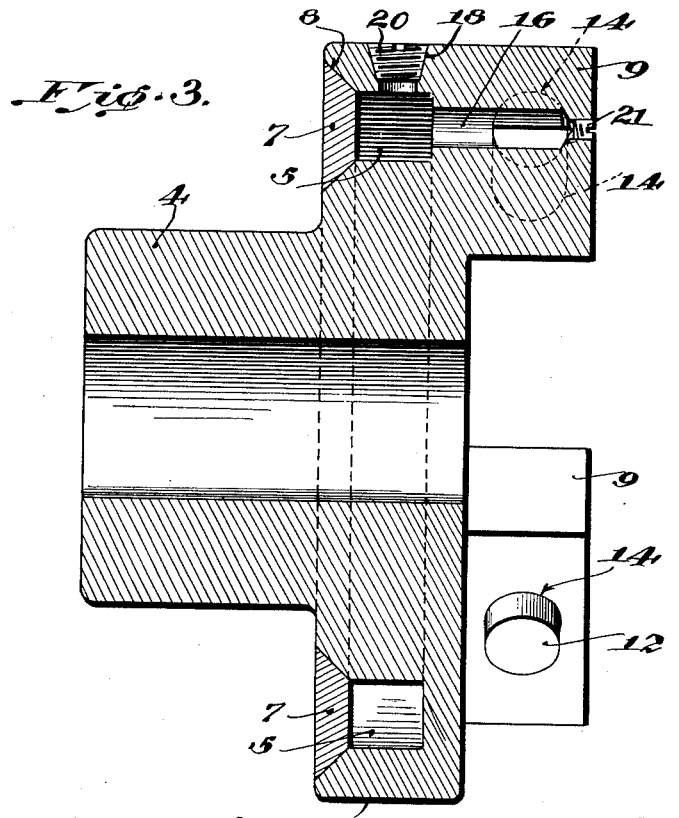
Figure 3 is a detail sectional view of the driver member.

Fluid chambers 5 and 6 (Fig. 1) are formed in the respective driver and driven members 2, 3 in any appropriate way, for instance by machining an annular groove to the requisite depth on the hub side of each member, then closing the groove by a ring 7 (Fig. 3) which is preferably welded in place. The edges of the grooves and rings are desirably bevelled at 8 so as to broaden the contact of the respective ring and to enable a flush seating of the ring with the adjacent vertical wall of the driver or driven member.

Figure 1:
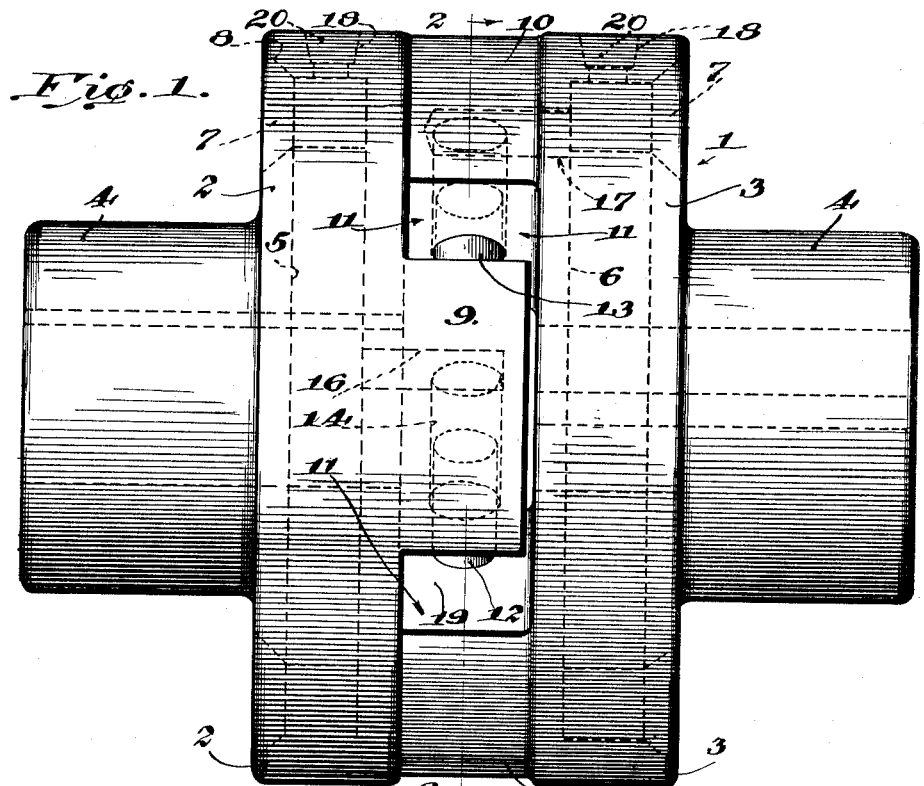
Figures 4, 5:
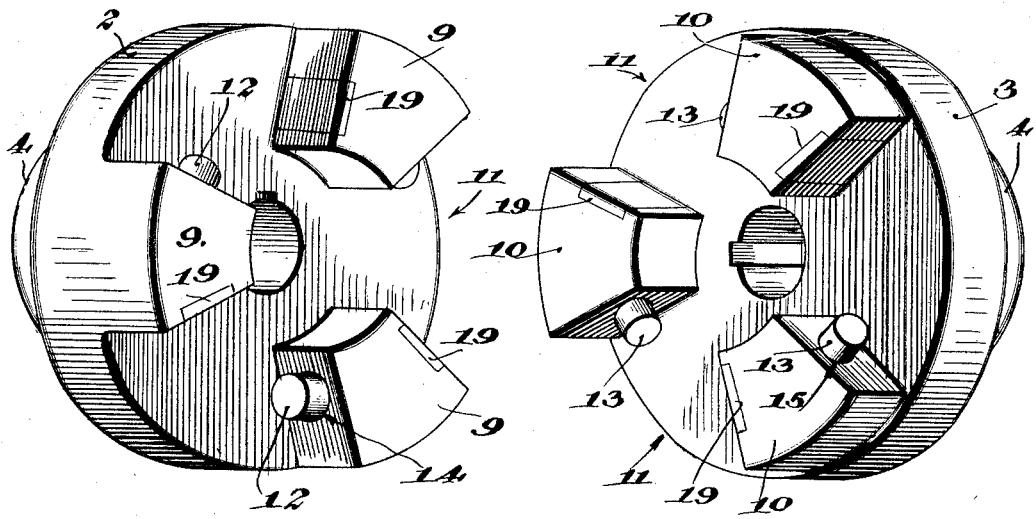
Figure 4 is a detail perspective view of the driver member.
Figure 5 is a detail perspective view of the driven member.

Abutments 9, 10 are made to project from those sides of the members 2, 3 opposite to the hubs 4 (Figs. 1, 4 and 5). The spaces 11 between the abutments are longer in the peripheral direction than the respective abutments 9, 10. These spaces provide ample room not only for the abutments but also for projecting plungers 12, 13 that are carried by the elements 9, 10.

It will be understood that every plunger is intended to work against an adjacent abutment. For instance, the set of plungers 12 of the driver member 2 will work against the abutments 10 of the driven member 3, while the set of plungers 13 of the driven member 3 will work against the abutments 9 of the driver member 2. The various abutments are virtually large but widely spaced teeth, each of which is provided with a plunger so that the space between the teeth will be taken up and that there will be a contact at a plurality of points, equidistantly spaced from each other around the coupling.

These plungers are partially housed by bores 14, 15 respectively in the abutments 9, 10 (Fig. 2) of the driver and driven members 2, 3. Channels 16, 17 afford communication between the various bores and the fluid chambers 5 and 6 behind them. The chambers are filled with oil or other appropriate fluid through openings 18 (Fig. 1) which are finally closed by screw plugs 20 as in Figure 3.

Prior to introducing the fluid it is desirable to assemble the driver and driven members 2, 3 in the ultimate confronting position (Fig. 1). In large couplings the plungers 12, 13 are previously inserted in the bores 14, 15 as far as they will go. Fluid is then forced into the chambers 5, 6, whence it will flow through the channels 16, 17 into the bores 14, 15 and tend to drive the plungers 12, 13 out against hardened wear plates 19 (Fig. 2) which are seated in the faces of the abutments next to the free ends of the plungers. In such couplings suitable vents in communication with the channels 16, 17, later closed by plugs such as at 21 (Fig. 3), let out the air ahead of the fluid. In filling small couplings before assembling them as above, the plungers can be removed, beginning with the lowest one, then holding the plungers at each bore 14 or 15 with a slight opening at the top side until the fluid starts to escape, whereupon that plunger is pushed in place. The statement was just made that the plungers tend toward being forced into engagement with the wear plates. Although the fluid is introduced under some pressure such pressure is only enough to project the plungers to what might be called a mid position. It is likely that the ends of some plungers might come closer to the adjacent wear plates 19 than others, thus leaving a variable spacing as depicted by Figure 2.

But when power is applied to the driver member 2 so that this is rotated in the clockwise direction (arrow a, Fig. 2), those plungers which project most will strike the wear plates 19 first thus setting up a pressure on the fluid volumes which back them and cause a distribution of the pressure throughout the entire fluid volume of the respective set of plungers, whereby those plungers which were previously not projected so far will now be projected into contact with the wear plate of the adjacent abutment.

It is thus that the pressure against all of the plungers of each set will automatically become equalized. All of the plungers will be projected to contacting positions with adjacent abutments so that there will be no point around the coupling that will be devoid of a contacting plunger.

Figure 2:
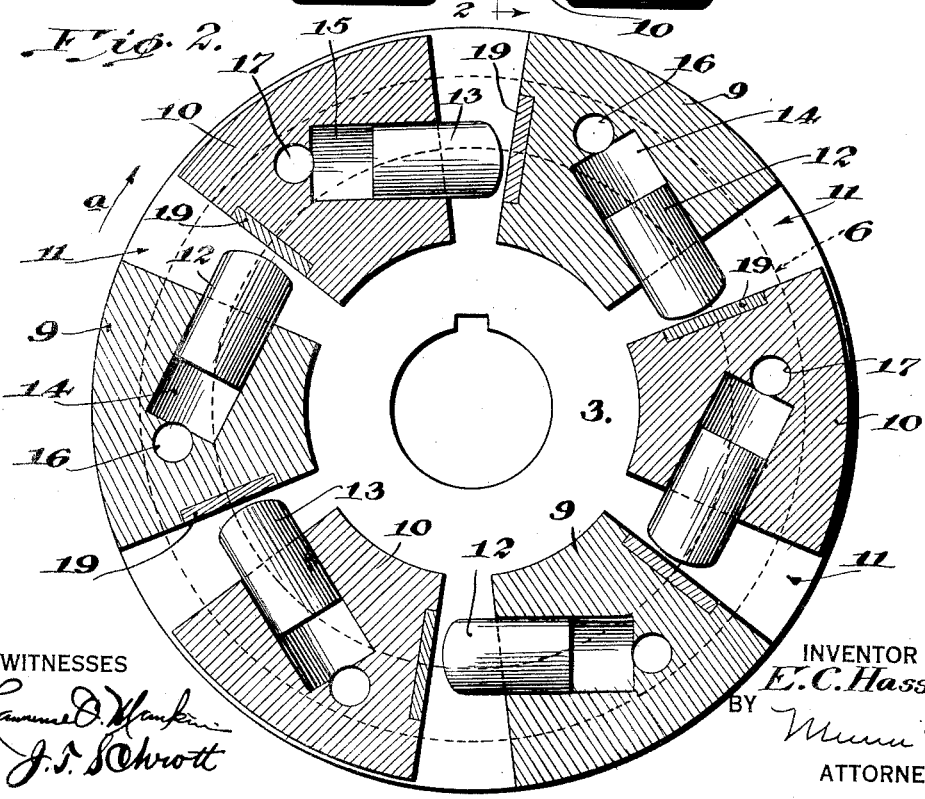
Figure 2 is a cross section taken on the line 2—2 of Figure 1, the position of the driving and driven members having been changed to the extent of a one-sixth turn to the right.

It is observed in Figure 2 that the plungers 12, 13 are freely seated. That is to say, they are not encumbered with connections of any sort. They are capable of a limited plunger or reciprocatory movement. Very little of such movement will be necessary; only enough to insure plunger contact at every contact point in back of every abutment around the coupling. But the arrangement is such that the plunger movement will be accompanied by a corresponding oscillation in the fluid volumes, that is to say, if one plunger should be pressed inwardly of its bore, the fluid volume in back of it would recede into the respective fluid chamber and out in some other bore where it is needed to press a plunger out.

From what has been said it is to be understood that the coupling will operate successfully even though its driver and driven members 2, 3 (Fig. 1) are not perfectly alined. It is extremely likely that when the coupling is employed for some purposes there might be such a misalinement that would assume serious proportions if proper compensation were not made. The freely seated plungers 12, 13 with their fluid backing insure a driving contact on all six points around the coupling so that any misalinement will be compensated for.

Any movement (in the axial direction of the members 2, 3) is provided for by making the wear plates 19 sufficiently extensive. The exposed ends of the plungers are intended to then rub on the wear plates.

I claim:—

1. A hydraulic coupling comprising hollow driver and driven members, a volume of fluid in each member, sets of abutments on each member being in interconnected but spaced relationship, and sets of movable plungers on the respective members one end of each of said plungers abutting the adjacent fluid volumes for the reception of equalized pressure through said volumes to cause contact of the other ends with the adjacent abutments.

2. A hydraulic coupling comprising driver and driven members having chambers, a volume of fluid in each chamber, abutments carried by said members having bores in communication with the respective chamber, said abutments being in interconnected but peripherally spaced relationship, and plungers freely seated in said bores, being backed by the fluid volumes, each plunger projecting from one side of an abutment to contact the opposite and confronting side of an adjacent abutment.

3. In a hydraulic coupling, a rotatable member having integral abutments each with a bore, said member having an internal chamber with which the bores communicate, and a ring comprising a closure for one side of the chamber.

ERNEST C. HASSLER.